(12) United States Patent
Takagi et al.

(10) Patent No.: US 7,323,224 B2
(45) Date of Patent: Jan. 29, 2008

(54) LIQUID DISPENSE METHOD AND MICROARRAY MANUFACTURING METHOD

(75) Inventors: Fumio Takagi, Chino (JP); Kazuhiko Ishihara, Mitaka (JP)

(73) Assignees: Seiko Epson Corporation (JP); Kazuhiko Ishihara (JP)

( * ) Notice: Subject to any disclaimer, the term of this patent is extended or adjusted under 35 U.S.C. 154(b) by 48 days.

(21) Appl. No.: 11/300,647

(22) Filed: Dec. 14, 2005

(65) Prior Publication Data

US 2006/0177585 A1 Aug. 10, 2006

(30) Foreign Application Priority Data

Dec. 22, 2004 (JP) ............................. 2004-372029

(51) Int. Cl.
*B05D 5/00* (2006.01)
*B05D 1/02* (2006.01)
*B05D 1/40* (2006.01)

(52) U.S. Cl. ................... 427/427.4; 427/565; 427/600; 427/256; 427/333; 427/337; 427/338; 427/427.3

(58) Field of Classification Search ..................... None
See application file for complete search history.

(56) References Cited

U.S. PATENT DOCUMENTS

| 6,770,729 | B2 * | 8/2004 | Van Antwerp | ................ 528/77 |
| 2003/0031699 | A1 * | 2/2003 | Van Antwerp | .............. 424/423 |
| 2003/0157260 | A1 * | 8/2003 | Rubner et al. | .............. 427/402 |
| 2005/0020729 | A1 * | 1/2005 | Renz et al. | ................ 523/160 |
| 2005/0288481 | A1 * | 12/2005 | DesNoyer et al. | .......... 528/310 |

FOREIGN PATENT DOCUMENTS

JP 11-187900 7/1999

\* cited by examiner

*Primary Examiner*—William Phillip Fletcher, III
(74) *Attorney, Agent, or Firm*—Harness, Dickey & Pierce, P.L.C.

(57) ABSTRACT

A method for discharging a liquid containing a biological material includes adding as a dispense stabilizer a polymer composed of phosphorylcholine-group-containing unsaturated compound units or a copolymer including same to the liquid containing the biological material; and discharging the liquid containing the dispense stabilizer using an inkjet system.

11 Claims, 2 Drawing Sheets

LIQUID DISPENSE METHOD AND MICROARRAY MANUFACTURING METHOD

The entire disclosure of Japanese Patent Application No. 2004-372029, filed Dec. 22, 2004, is expressly incorporated by reference herein.

BACKGROUND

1. Technical Field

The present invention relates to a method for discharging a liquid containing a biological material, and a microarray manufacturing method using such a dispense method. More specifically, the invention relates to a dispense method that can improve dispense stability when a liquid containing a biological material is dispensed using an inkjet system, and a microarray manufacturing method using such a dispense method.

2. Related Art

DNA microarrays (DNA chips) have been utilized as a technique for monitoring gene expression patterns or screening new genes. Meanwhile, protein microarrays (protein chips) for use in protein analysis have also been being developed lately using the same technique used in DNA microarrays. Microarrays can be manufactured by spotting a sample solution containing a biological material such as DNA or proteins densely onto a substrate such as a glass slide. Known examples of this sample solution spotting method are one using contact pins, and one using an inkjet system, for example, as disclosed in JP-A-11-187900.

The inkjet system has an advantage in that it enables creating a stable spot shape quickly and also enables preparing high-density microarrays by narrowing the nozzle pitch.

A droplet discharging head is used in the manufacture of microarrays utilizing the inkjet system. In terms of reducing the manufacturing cost, etc., the droplet discharging head needs to be able to be used repeatedly by being refilled with the sample solutions. Particularly, if multiple kinds of biological materials are used to manufacture a microarray, the droplet discharging head needs to be able to achieve good dispense performance even after it has been washed inside and refilled with a new liquid.

However, when a biological material readily adsorbed to a solid-phase surface, such as proteins, is used as a sample solution, the biological material may be adsorbed to the inner walls of the droplet discharging head, and cannot be removed even by washing the inside of the droplet discharging head, which might cause significant change in channel performance and result in a deterioration in dispense performance.

SUMMARY

An advantage of some aspects of the invention is a liquid dispense method that can improve dispense stability when discharging a biological material even in a repeated manner, and a microarray manufacturing method using such a dispense method.

According to an aspect of the invention, a method for discharging a liquid containing a biological material is provided, the method including: adding as an dispense stabilizer a polymer composed of phosphorylcholine-group-containing unsaturated compound units or a copolymer including same to the liquid containing the biological material; and discharging the liquid containing the dispense stabilizer using an inkjet system.

With the above method, since a polymer or a copolymer having a phospholipid polar group (phosphorylcholine group), which is a main constituent of biological membranes, is included as a dispense stabilizer, even when a liquid containing a biological material readily adsorbed to a solid-phase surface, such as proteins (hereinafter also referred to as a sample solution), is used, it is possible to prevent the biological material, such as proteins, from being adsorbed to the inner walls of a droplet discharging head used for discharging droplets by an inkjet system. Thus, deterioration in channel performance can be avoided even when the droplet discharging head is used repeatedly. Accordingly, it is possible to improve dispense stability in discharging the liquid containing the biological material using the inkjet system.

In this case, the biological material includes, for example, naturally derived cells, proteins, nucleic acids, and other such substances, as well as artificially synthesized oligonucleotides, polynucleotides, oligopeptides, polypeptides, PNS(peptide nucleic acids), and other such analogues. With this method of the invention, when a biological material that is particularly readily adsorbed to a solid substrate, examples of which are nucleic acids, cells, proteins, and peptides such as oligopeptides and polypeptides, is contained in the liquid, dispense stability can be significantly improved.

It is preferable that the copolymer includes, as constituent units, the phosphorylcholine-group-containing unsaturated compound units (constituent units a1) and (meth)acrylic ester units (constituent units a2). With this composition, the included phosphorylcholine-group-containing unsaturated compound units (constituent units a1) contribute to good biocompatibility. Also, the included (meth)acrylic ester units (constituent units a2) are prone to adsorb to the inner walls of the droplet discharging head or to the subject biological material in an aqueous medium by hydrophobic interaction, and can accordingly contribute to further stabilizing the dispense of the biological material.

It is preferable that the copolymer further includes, as constituent units, vinyl compound units (constituent units a3) other than the above constituent units a1 and constituent units a2. With this composition, since hydrogen-bonding interactions, electrostatic interactions, or other such interactions between the molecules are enhanced, adsorption to or enclosing of the biological material can be made more positively, to stabilize the biological material structure, resulting in improved dispense stability.

The phosphorylcholine-group-containing unsaturated compound units (constituent units a1) are constituent units derivatized from phosphorylcholine-group-containing unsaturated compounds, and the (meth)acrylic ester units (constituent units a2) are constituent units derivatized from (meth)acrylic esters. Furthermore, the vinyl compound units (constituent units a3) other than the above constituent units a1 and constituent units a2 are constituent units derivatized from vinyl compounds other than the above constituent units a1 and constituent units a2.

It is preferable that the copolymer includes, as constituent units, the phosphorylcholine-group-containing unsaturated compound units (constituent units a1); and the vinyl compound units (constituent units a3) other than the above constituent units a1 and constituent units a2. The structure of some biological materials may be destroyed by the hydrophobic alkyl groups of the (meth)acrylic esters by their surfactant effects. In that case, if the vinyl compounds other than constituent units a1 and constituent units a2 are included as constituent units, they can be adsorbed to or enclose those biological materials, and thus can stabilize the biological material structure.

It is preferable that the phosphorylcholine-group-containing unsaturated compound units (constituent units a1) are 2-methacryloyloxyethyl phosphorylcholine units (hereinafter referred to as MPC). By using MPC, which includes in a single molecule a phospholipid polar group (phosphorylcholine group) that is a constituent of biological membranes, and a methacryloyl group having good polymerizability, superior biocompatibility and coating ability can be achieved, so, for example, it is possible to effectively prevent adsorption of the bio-related material such as proteins included in the sample solution. In addition, MPC is suitable in terms of a stable supply of monomers.

The molar ratio of the constituent units a1 to the constituent units a2 ranges preferably from 100/0 to 30/70 (excluding (a1)/(a2) being 100/0), more preferably from 95/5. to 30/70. If the ratio is within the above range, solubility in an aqueous medium containing the biological material, adsorbability to an interface, or ability to enclose the biological material tends to be further enhanced.

If the copolymer is configured to further include the constituent units a3, the constituent units a3 are contained in an amount ranging from 0 to 95 mole% (excluding 0 mole %) relative to the total constituent units in the copolymer, preferably from 5 to 95 mole %. When the amount is within the above range, even if it is necessary to more positively bring about adsorption to an interface or enclosing of an unstable biological material such as cells without deteriorating biocompatibility, it is possible to further enhance adsorbability to an interface and ability to enclose the biological material.

If the copolymer is configured to include the constituent units a1 and the constituent units a3, the molar ratio of the constituent units a1 to the constituent units a3 ranges from 100/0 to 5/95 (excluding (a1)/(a3) being 100/0), preferably from 95/5 to 5/95. If the ratio is within the above range, it is possible to further increase adsorbability to an interface and ability to enclose the biological material without deteriorating solubility in the aqueous medium and biocompatibility.

It is preferable that the dispense stabilizer is added to the liquid to achieve a concentration ranging from 0.005 to 500 mg/ml. If the concentration is within the above range, it is possible to stabilize the dispense of the liquid containing the biological material.

It is preferable that the inkjet system is based on a piezoelectric drive system or an electrostatic drive system. These systems generate no heat when driving the droplet discharging head, unlike so-called thermal inkjet systems. Thus, stable dispense can be realized without damaging the biological material contained in the sample solution.

A microarray manufacturing method according to another aspect of the invention includes: discharging the liquid onto a solid substrate using the above-described dispense method; and immobilizing the biological material contained in the liquid to the solid substrate.

With the above microarray manufacturing method, since it uses the above-referenced dispense method that can stabilize dispense performance, it is possible to manufacture microarrays with good yields.

BRIEF DESCRIPTION OF THE DRAWINGS

A method for discharging a liquid containing a biological material according to an aspect of the invention is described below, using a microarray manufacturing method as one example.

DESCRIPTION OF EXEMPLARY EMBODIMENTS

Figure 1:
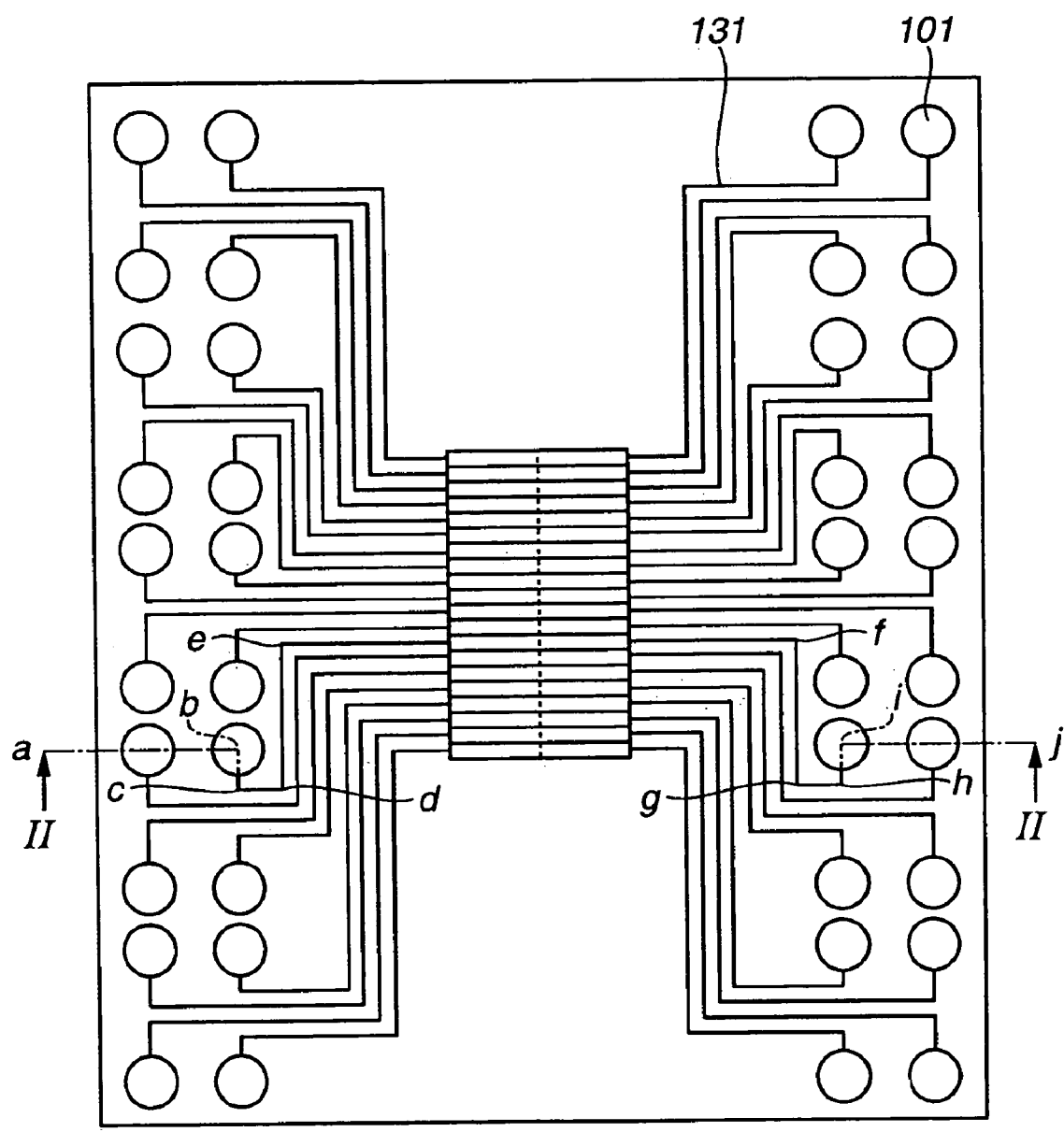
FIG. 1 is a top view of a droplet discharging head used for the first embodiment of the invention.

The microarray manufacturing method according to this embodiment includes: a surface treatment step (S1) for treating the surface of a solid substrate (such as a glass substrate); a sample solution preparation step (S2) for preparing a sample solution containing a biological material and a dispense stabilizer; a supplying step (S3) for supplying the sample solution to the solid substrate using an inkjet system; and a immobilizing step (S4) for immobilizing the sample solution to the solid substrate.

Each step is sequentially described below.

Surface Treatment Step (S1)

In the surface treatment step (S1), the surface of a solid substrate (such as a glass substrate) is subjected to a surface treatment (coating treatment) suitable for immobilizing a biological material. One example of such a surface treatment is introducing a functional group such as an amino group, an epoxy group, an aldehyde group, a thiol group, or a carboxyl group, which can be bonded to a biological material, onto a solid substrate surface. A more specific example is coating treatment with aminosilane, epoxyamine, poly-L-lysine, or similar. The surface treatment is not limited to the above examples, and a previously known surface treatment method may be used as appropriate.

Sample Solution Preparation Step (S2)

Next, a sample solution containing a biological material and a dispense stabilizer is prepared. As a sample solution preparing method, a previously known method plus adding a dispense stabilizer may be used. There is no particular restriction on the timing of the dispense stabilizer being added, and it can be added at any point in time. However, from the viewpoint of further stabilizing the structure of the biological material, it is preferable to add an inorganic salt or a water-soluble compound with a low to medium molecular weight.

It is preferable that the dispense stabilizer is added to have a concentration relative to the sample solution of 0.005 to 500 mg/ml, more preferably 0.05 to 100 mg/ml. When the concentration of the dispense stabilizer is within the above range, dispense of the liquid containing the biological material can be further stabilized. In other words, if the concentration is below the above range, the stability of the interface or the biological material is likely to be reduced. Meanwhile, if the concentration exceeds the above range, the viscosity of the sample solution increases and dispense performance from a droplet discharging head is likely to be deteriorated.

As the biological materials (probes), naturally-derived materials such as cells, proteins, or nucleic acids, as well as artificially-synthesized oligonucleotides, polynucleotides, oligopeptides, polypeptides, PNAs (peptide nucleic acids), or other such analogues may be used. According to the invention, when biological materials, for example, cells, proteins, or peptides (such as oligopeptides or polypeptides), which are particularly prone to be adsorbed to the solid substrate, are used, dispense stability can be significantly improved.

A dispense stabilizer explained herein is an agent added to stabilize the dispense of the sample solution upon it being dispensed by an inkjet system. An example of a preferably used dispense stabilizer is a polymer composed of phosphorylcholine-group-containing unsaturated compound units or a copolymer containing phosphorylcholine-group-containing unsaturated compound units as constituent units. Since a polymer or a copolymer including a phospholipid polar group (phosphorylcholine group), which is a constituent of biological membranes, is included as the dispense stabilizer, even if a liquid containing a biological material readily adsorbed to the solid substrate surface, such as proteins, is used, it is possible to prevent channel performance deterioration due to adsorption of the biological material such as proteins to the inner walls of the droplet discharging head (inkjet head) used for discharging droplets by an inkjet system.

Examples of the phosphorylcholine-group-containing unsaturated compounds used for producing the above-described polymer or copolymer include MPC; 2-methacryloyloxyethoxyethyl phosphorylcholine; 6-methacryloyloxyhexyl phosphorylcholine; 10-methacryloyloxydecyl phosphorylcholine; allyl phosphorylcholine; butenyl phosphorylcholine; hexenyl phosphorylcholine; octenyl phosphorylcholine; and decenyl phosphorylcholine. In particular, MPC is preferable because of its good polymerizability, ready availability, etc. The phosphorylcholine-group-containing unsaturated compounds may be used alone or in a combination of two or more types.

Preferably, the phosphorylcholine-group-containing copolymer includes constituent units derivatized from methacrylic esters (constituent units a2), as constituent units other than the phosphorylcholine-group-containing unsaturated compound units (constituent units a1). Examples of the constituent units a2 include methacrylic acid; methyl methacrylate; ethyl methacrylate; n-butyl methacrylate; hexyl methacrylate; 2-hydroxyethyl methacrylate; and other such methacrylic esters. The constituent units a2 may be used alone, or in a combination of two or more types. When the constituent units derivatized from methacrylic esters (constituent units a2) are included, adsorbability to the inner walls of the droplet discharging head or to the subject biological material can be further enhanced due to the hydrophobic interaction in an aqueous medium, which is itself preferable.

Constituent units derivatized from vinyl compounds other than the above constituent units a1 and constituent units a2 (constituent units a3) may also be included in the phosphorylcholine-group-containing copolymer. Examples of the constituent units a3 include vinyl chloride; acrylonitrile; vinylpyrrolidone; styrene; vinyl acetate; and other such copolymerizable monomer units derivatized from vinyl compounds (vinyl compound units). Such constituent units a3 may be used alone or in a combination of two or more types. If the constituent units a3 are included, enabling adsorption to or enclosing of the biological material, the biological material structure can be stabilized. In particular, the structure of some biological materials may be destroyed because of the surfactant effects caused by the hydrophobic alkyl groups of the methacrylic esters contained in the constituent units a1 or a2. However, by the constituent units a3 being included, the proportion of the hydrophobic alkyl groups of the methacrylic esters can be reduced. Accordingly, destruction due to the above-mentioned factor can be reduced, and furthermore, the effect of adsorption to or enclosing of the biological material can be kept by the constituent units (a3).

It is normally desirable that the phospholylchorin-group-containing copolymer contains the phosphorylcholine-group-containing unsaturated compound units in an amount of 5-100 mol %, preferably 5-95 mol %, relative to the total constituent units, although the desirable amount differs depending on what kinds of comonomers are combined with the constituent units (a1). If the contained amount is below the above range, compatibility with biological materials tends to diminish.

If the phospholylchorin-group-containing copolymer is a copolymer including the constituent units a1 and the constituent units a2), it is desirable that the (constituent units a1)/(constituent units a2) molar ratio is from 95/5 to 30/70. If the phospholylchorin-group-containing copolymer further includes the constituent units a3 in addition to the constituent units a1 and the constituent units a2, it is desirable that the constituent units a3 are contained in an amount of 5-95 mol % relative to the total constituent units in the copolymer.

If the phospholylchorin-group-containing copolymer is a copolymer including the constituent units a1 and the constituent units a3, it is desirable that the (constituent units a1)/(constituent units a3) molar ratio is from 95/5 to 5/95.

The above-described phospholylchorine-group-containing (co)polymer can be manufactured using a previously known method. Or, such a (co)polymer is commercially available in the market, for instance, available from NOF Corporation (Nippon Yushi Kabushikikaisha).

As a solvent used for preparing the sample solution, there is no particular limitation as long as one can disperse or dissolve the biological material and the dispense stabilizer contained in the sample solution without deteriorating their properties. An example of a preferably used solvent is a phosphate buffered solution (hereinafter also referred to as PBS).

Various kinds of additives such as glycerin may also be added to the sample solution, if necessary.

Supplying Step (S3)

In the supplying step (S3), the sample solution as prepared above is supplied to the solid substrate subjected to the surface treatment as described before, using the inkjet system.

One example of a droplet discharging head used for supplying a sample solution is one configured as shown in FIGS. 1 and 2. FIG. 1 is a top view of a droplet discharging head used for this step, and FIG. 2 is a view explaining the cross section of the droplet discharging head along the line a-j in FIG. 1. The droplet discharging head used for this step is explained below with reference to FIGS. 1 and 2.

FIG. 1 is a top view schematically showing the droplet discharging head according to one embodiment of the invention. FIG. 2 is a view explaining the cross section of the droplet discharging head along the line a-j in FIG. 1.

As shown in FIGS. 1 and 2, the droplet discharging head 1 used in this embodiment has a plurality of reservoir chambers 101 that can hold sample solutions. The sample solutions provided to the respective reservoir chambers 101 are led into pressure chambers 105 through microchannels 131, and dispensed from nozzle holes 106 in the form of droplets as a result of an internal pressure change caused by elastic displacement of oscillating plates 109.

As shown in FIG. 2, the main components of the droplet discharging head 1 according to this embodiment are: a first substrate 121 with electrodes 108 formed thereon (hereinafter referred to as "electrode substrate"); a second substrate 122 having the pressure chambers 105 for applying pressure to dispense the sample solutions (hereinafter referred to as "pressure chamber substrate"); a third substrate 123 with the nozzle holes 106 (hereinafter referred to as "nozzle substrate"); and a reservoir unit 120 having the reservoir chambers 101 for holding the sample solutions. The droplet discharging head 1 may also include, as required, a channel substrate 124 on which the microchannels 131 (hereinafter also simply referred to as "channels") are formed to connect the reservoir chambers 101 and the pressure chambers 105. There is no particular limitation on the constituent material of the electrode substrate 121, the pressure chamber substrate 122 and the nozzle substrate 123, but preferably glass, silicon, or similar may be used. Moreover, there is no particular limitation on the constituent material of the reservoir unit 120, but preferably glass, silicone, resin, or similar may be used.

The electrode substrate 121 has concave portions formed on its surface opposing the pressure chamber substrate 122, at the positions corresponding to the respective pressure chambers 105. The concave portions constitute substantially uniform minute gaps with the oscillating plates 109 formed on the bottom portion of the pressure chambers 105 of the pressure chamber substrate 122. The minute gaps are of a necessary and sufficient size to electrostatically drive the droplet discharging head 1, for example 0.2 µm. The bottom surface of each concave portion is coated with the electrode 108 in an elongate film form (for example, an indium tin oxide film) to generate electrostatic force between the electrode and the pressurization chamber substrate 122.

For driving the droplet discharging head 1 configured as above, the output voltage from an outside power source (not shown in the drawings) is applied between a common electrode (not shown in the drawings) formed as a gold or platinum film on the end surface of the pressure chamber substrate 122, and the electrode 108 formed as a film on the electrode substrate 121. The output voltage is a rectangular pulse wave having an amplitude from 0 to 35 V. Then, the surface of the electrode 108 is positively charged while the opposing surface of the pressurization chamber substrate 122 is negatively charged. As a result, electrostatic force acts on both components, and the bottom portion of the pressurization chamber 105, which is a thin portion of the pressurization chamber substrate 122, slightly bends, i.e., is elastically deformed toward the electrode substrate 121. In other words, a flexible silicon oxide film formed on the bottom portion of the pressurization chamber 105 is elastically deformed by the electrostatic drive, and functions as an oscillating plate 109 adjusting the pressure inside the pressure chamber 105. When the voltage being applied to the electrode 108 is then shut off, the electrostatic force is released and the oscillating plate 109 is returned to its original position. So, the pressure inside the pressurization chamber 105 increases sharply and instantaneously, and thus the sample solution is dispensed from the nozzle hole 106 as minute droplets in dot form. The droplets are microdots of several picoliters. The oscillating plate 109 that has bent toward the pressure chamber 105 bends back toward the electrode substrate 121, which causes a sharp decrease in the pressure inside the pressure chamber 105. Thereby, the sample solution is supplied to the pressure chamber 105 from the reservoir chamber 101 through the channel.

In this embodiment, of the inner walls of the droplet discharging head, the portions that come into contact with the sample solution (for example the inner walls of the reservoir chamber 101, the channels, the pressure chamber 105, and the nozzle hole 106) may be coated with a polymer composed of phosphorylcholine-group-containing unsaturated compound units or a copolymer including the same (hereinafter referred to as a phosphorylcholine-group-containing (co)polymer), the same as the one used as the dispense stabilizer. By this coating, adsorption of the biological material to the inner walls of the droplet discharging head can be prevented, and thus the dispense stability can be further improved.

In the above explanation, the inkjet system based on an electrostatic drive system is used. However, a piezoelectric drive system may also be used. Using an electrostatic drive system or piezoelectric drive system, no heat is generated in driving the droplet discharging head, unlike so-called thermal inkjet systems. Thus, stable dispense can be made without damaging the biological material contained in the sample solution.

Immobilizing Step (S4)

In this step, the sample solution that has been dispensed and spotted onto the solid substrate as described above is dried and immobilized. The immobilizing step for the sample solution is performed by a previously known method. Specifically, the sample solution can be dried and immobilized by, for example, heating the substrate. The immobilizing method is not limited to the above method, and the best suitable immobilizing method should be selected for each sample. For example, it may be suitable for some samples to be immobilized in a high-humidity environment preventing it from being dried.

By following the above-explained steps, a microarray can be obtained.

According to the microarray manufacturing method of this embodiment, a polymer composed of phosphorylcholine-group-containing unsaturated compound units or a copolymer including the same is added as a dispense stabilizer to a liquid containing a biological material to be dispensed. Accordingly, even if the liquid containing a biological material readily adsorbed to a solid phase surface, such as proteins, is used, the above polymer or copolymer can cover the surroundings of the biological material (such as proteins) and stabilize it, and so channel performance deterioration due to adsorption of the biological material (such as proteins) to the inner walls of the droplet discharging head can be prevented. Consequently, it is possible to improve dispense stability during dispense of the liquid containing the biological material by an inkjet system. In particular, the dispense stability after removing the liquid from the droplet discharging head, washing the head with a washing agent such as a phosphate buffer solution, and refilling it with the sample solution can also be improved.

A droplet discharging head based on the electrostatic drive system has been explained in this embodiment. However, the invention is not limited to this, and a piezoelectric drive system using piezo elements may also be used.

EXAMPLES

Preparation Example 1

Sample Solution Preparation

As a polymer composed of phosphorylcholine-group-containing unsaturated compound units or a copolymer including the same (hereinafter referred to as a PC polymer), a 5% aqueous solution of a copolymer composed of MPC and BMA (butyl methacrylate) with a molar ratio of 3:7 was prepared, and then diluted with phosphate buffer solution (PBS) to 0.5%. After that, Bovine Serum Alubumin (BSA) was dissolved in the resulting solution to have a concentration of 10 mg/ml, thereby preparing a sample solution.

Comparative Preparation Example 1

Sample Solution Preparation

Another sample solution was prepared as a comparative example by following the same process as in Preparation Example 1, except no PC polymer was added.

Dispense Test

Figure 2:
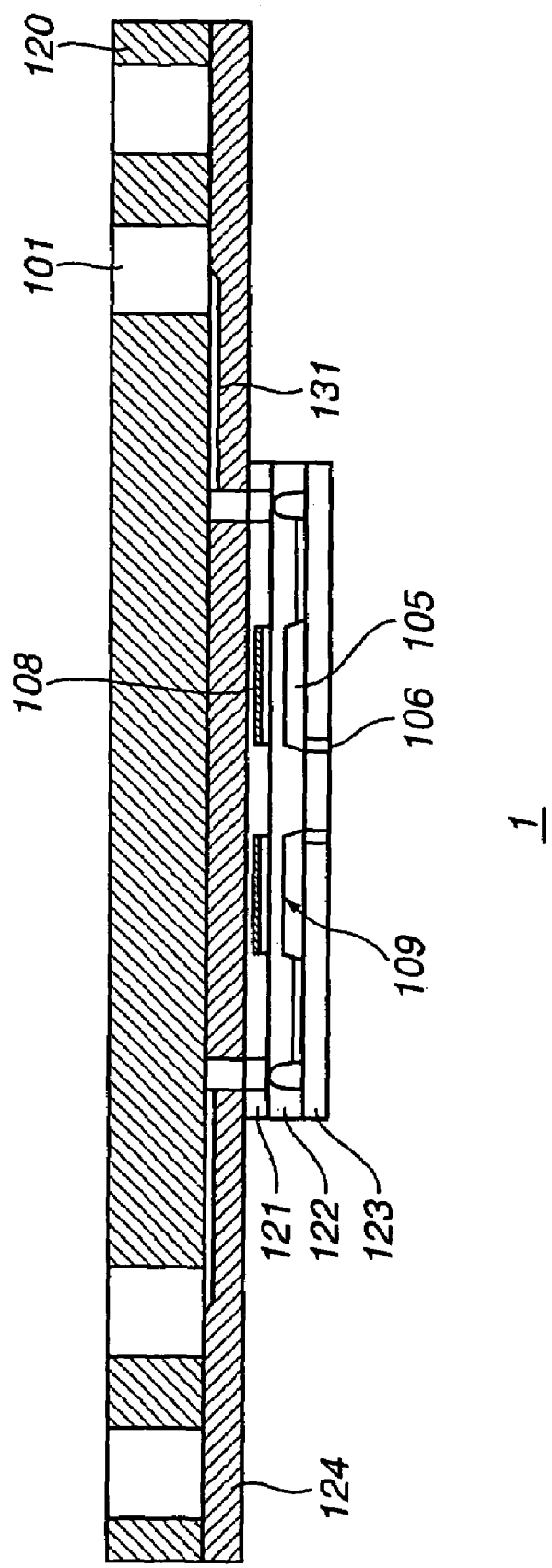
FIG. 2 is a cross-sectional view of the droplet discharging head along the line a-j in FIG. 1.

A dispense test was conducted for the respective sample solutions of Preparation Example 1 and Comparative Preparation Example 1, using an electrostatically driven droplet discharging head as shown in FIGS. 1 and 2. In the dispense test, each solution was dispensed 10,000 times promptly after the droplet discharging head was filled with that solution, and the average weight of the dispensed droplets was measured. Table 1 shows the results.

As shown in Table 1, in the dispense performed shortly after the filling, the dispense amounts were almost the same regardless of whether the PC polymer was added or not, and stable dispense was possible.

Next, each droplet discharging head was let stand for 10 minutes after the first filling. Then, the sample solution in each droplet discharging head was removed using a peristaltic pump, and the inside of the droplet discharging head was washed by flushing the head with PBS inside. After that, the droplet discharging heads were respectively refilled with the sample solutions of Preparation Example 1 and Comparative Preparation Example 1. Then, each sample solution was dispensed according to the same method as mentioned above. The results are shown in Table 1.

For the sample solution of Comparative Preparation Example 1 where no PC polymer was added, non-dispense, dispense amount decrease, or spot position errors were observed in many dispenses. Meanwhile, for the sample solution of Preparation Example 1 where a PC polymer was added, it was found that almost the same dispense performance as in the first filling was achieved in almost all the nozzles.

TABLE 1

Dispense Test Results

| | First Filling | Refilling |
|---|---|---|
| Preparation Example 1 (PC polymer added) | 175 ng | 180 ng |
| Comparative Preparation Example 1 (No PC polymer added) | 180 ng | 50 ng |

The reasons for the unstable dispense that occurred when no PC polymer was added can be considered to be that proteins such as BSA were adsorbed to, for example, the nozzle inner walls of the droplet discharging head, the structure of those proteins was destroyed, and so the surface state of the nozzle inner walls was changed. In particular, the adsorption can be thought of as having decreased the hydrophilic property of the inner walls of the droplet discharging head, which caused air bubbles to be easily trapped, impairing dispense performance more markedly. Meanwhile, in the case of adding a PC polymer, the PC polymer can be thought of as having enabled reducing protein. adsorption to the inner walls of the droplet discharging head and accordingly achieving stable dispense over a long period of time, even after fillings being made repeatedly.

What is claimed is:

1. A method for discharging a liquid containing a biological material, comprising:
    adding as a dispense stabilizer a polymer composed of phosphorylcholine-group-containing unsaturated compound units or a copolymer including same to the liquid containing the biological material; and
    discharging the liquid containing the dispense stabilizer using an inkjet system.

2. The dispense method according to claim 1, wherein the copolymer includes as constituent units the phosphorylcholine-group-containing unsaturated compound units and (meth)acrylic ester units.

3. The dispense method according to claim 2, wherein the copolymer further includes as constituent units vinyl compound units other than the phosphorylcholine-group-containing unsaturated compound units and the(meth)acrylic ester units.

4. The dispense method according to claim 1, wherein the copolymer includes as constituent units the phosphorylcholine-group-containing unsaturated compound units, and vinyl compound units other than the phosphorylcholine-group-containing unsaturated compound units and (meth)acrylic ester units.

5. The dispense method according to claim 1, wherein the phosphorylcholine-group-containing unsaturated compound units are 2-methacryloyloxyethyl phosphorylcholine units.

6. The dispense method according to claim 2, wherein a molar ratio of the phosphorylcholine-group-containing unsaturated compound units to the(meth)acrylic ester units ranges from 100/0 to 30/10, excluding phosphorylcholine-group-containing unsaturated compound units)/(meth) acrylic ester units) being 100/0.

7. The dispense method according to claim 3, wherein the vinyl compound units other than phosphorylcholine-group-containing unsaturated compound units and (meth)acrylic ester units are contained in an amount ranging from 0 mole % to 95 mole %, excluding 0 mole %, relative to the total constituent units in the copolymer.

8. The dispense method according to claim 4, wherein a molar ratio of the phosphorylcholine-group-containing unsaturated compound units to the vinyl compound units other than phosphorylcholine-group-containing unsaturated compound units and (meth)acrylic ester units ranges from 100/0 to 5/95, excluding (phosphorylcholine-group-containing unsaturated compound units)/(vinyl compound units other than phosphorylcholine-group-containing unsaturated compound units and (meth)acrylic ester units) being 100/0.

9. The dispense method according to claim 1, wherein the dispense stabilizer is added to the liquid to achieve a concentration ranging from 0.005 to 500 mg/ml.

10. The dispense method according to claim 1, wherein the inkjet system is based on a piezoelectric drive system or an electrostatic drive system.

11. A microarray manufacturing method comprising:
    discharging the liquid onto a solid substrate using the dispense method according to claim 1; and
    immoibilizing the biological material contained in the liquid to the solid substrate.

* * * * *